(12) United States Patent
Hayter et al.

(10) Patent No.: US 8,140,974 B2
(45) Date of Patent: Mar. 20, 2012

(54) PRESENTING SECONDARY MEDIA OBJECTS TO A USER

(75) Inventors: Kjersten Hayter, Issaquah, WA (US); Jonathan M. Cain, Seattle, WA (US); William Frederick Kiefer, III, Seattle, WA (US); Nancy Phan, Seattle, WA (US); Seung Yang, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 900 days.

(21) Appl. No.: 11/956,975

(22) Filed: Dec. 14, 2007

(65) Prior Publication Data
US 2009/0158198 A1 Jun. 18, 2009

(51) Int. Cl.
*G06F 3/048* (2006.01)
(52) U.S. Cl. ........ 715/727; 715/810; 715/864; 345/169; 707/805
(58) Field of Classification Search .................. 715/716, 715/719, 726, 764, 765, 810, 835, 838, 846, 715/856, 862, 863, 864, 205; 345/163, 169; 707/10, 104.1, 781, 805; 709/201, 203, 217, 709/219
See application file for complete search history.

(56) References Cited

U.S. PATENT DOCUMENTS

| | | | | | |
|---|---|---|---|---|---|
| 5,461,415 | A | * | 10/1995 | Wolf et al. | 725/88 |
| 6,016,520 | A | * | 1/2000 | Facq et al. | 710/33 |
| 7,191,462 | B1 | * | 3/2007 | Roman et al. | 725/98 |
| 7,234,114 | B2 | | 6/2007 | Kurtz | |
| 7,607,157 | B1 | * | 10/2009 | Inoue et al. | 725/102 |
| 2001/0047384 | A1 | * | 11/2001 | Croy | 709/203 |
| 2002/0049974 | A1 | * | 4/2002 | Shnier | 725/47 |
| 2004/0034711 | A1 | * | 2/2004 | Hughes | 709/231 |
| 2004/0167890 | A1 | | 8/2004 | Eyal | |
| 2005/0210416 | A1 | | 9/2005 | MacLaurin | |
| 2006/0288368 | A1 | | 12/2006 | Huslak | |
| 2006/0294476 | A1 | | 12/2006 | Buckley | |
| 2007/0003223 | A1 | * | 1/2007 | Armstrong et al. | 386/95 |
| 2007/0130538 | A1 | | 6/2007 | Chiu | |
| 2007/0130602 | A1 | | 6/2007 | Gulli | |
| 2008/0066010 | A1 | * | 3/2008 | Brodersen et al. | 715/810 |
| 2008/0147711 | A1 | * | 6/2008 | Spiegelman et al. | 707/102 |
| 2008/0152300 | A1 | * | 6/2008 | Knee et al. | 386/68 |
| 2009/0013288 | A1 | * | 1/2009 | Scheflan | 715/859 |
| 2009/0024411 | A1 | * | 1/2009 | Albro et al. | 705/2 |
| 2009/0063660 | A1 | * | 3/2009 | Fleischman et al. | 709/219 |

OTHER PUBLICATIONS

"MediaMonkey Features," 2007, www.mediamonkey.com/product_gold.htm, 2 pp.
"MP3 Viewer," 2007, www.4musics.com/Players/MP3-Viewer.htm, 1 page.
"Blueprint: Video File Preview," 2004, https://blueprints.launchpad.net/ubuntu/+spec/video-preview, 1 page.

* cited by examiner

*Primary Examiner* — Xiomar L Bautista
(74) *Attorney, Agent, or Firm* — Shook, Hardy & Bacon L.L.P.

(57) ABSTRACT

Systems, methods, computer-readable media, and graphical user interfaces for presenting secondary media objects are provided. A primary media presenting module presents primary media. Upon detecting an indication to initiate the presentation of a secondary media object, the primary media object may be delayed and the secondary media object may be initiated. In embodiments, an indication to initiate the presentation of a secondary media object may comprise a selector hovered over a song title associated with the secondary media object. At a later instance, the primary media object may resume such that it resumes at the point at which the primary media object was delayed. In embodiments, a user may initiate the resuming of the primary media object by removing the selector from the song title.

18 Claims, 7 Drawing Sheets

PRESENTING SECONDARY MEDIA OBJECTS TO A USER

BRIEF SUMMARY

Embodiments of the present invention relate to systems, graphical user interfaces, and computer-readable media for presenting secondary media objects. A primary media presenting module presents primary media. Upon detecting an indication to initiate the presentation of a secondary media object, such as a representative sample, the primary media object may be delayed so that it may be resumed at the same position at a later instance, and the secondary media object may be initiated. In embodiments, an indication to initiate the presentation of a secondary media object may comprise a selector hovered over a song title associated with the secondary media object. At a later instance, the primary media object may be presented as though no interruption occurred. In embodiments, a user may initiate resumption of the primary media object by removing the selector from its hovering position with respect to the song title.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Embodiments are described in detail below with reference to the attached drawing figures, wherein.

DETAILED DESCRIPTION

The subject matter of embodiments of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention provide systems, methods, and computer-readable media for presenting secondary media objects. More specifically, in one embodiment, embodiments may enable a user to preview a representative sample. An indication to initiate the presentation of a secondary media object is detected. Upon detecting an indication to initiate the presentation of a secondary media object, the primary media object may be delayed and the secondary media object may be initiated. At a later instance, the primary media object may resume such that it resumes at the point at which the primary media object was delayed.

Accordingly, in one aspect, the present invention provides one or more computer-readable media having computer-executable instructions embodied thereon that, when executed, perform a method for presenting secondary media objects to a user while momentarily delaying primary media objects. The method includes detecting an indication to initiate the presentation of a secondary media object. The indication to initiate the presentation of the secondary media object is detected while a primary media object is presented to a user. If the indication is detected, the method continues by delaying the primary media object at a stopping point and presenting the secondary media object. The method includes resuming the primary media object from the stopping point.

In another aspect, a computerized system for presenting secondary media objects to a user while momentarily delaying primary media objects is provided. The system includes a primary media presenting module configured to present a primary media object, and a secondary media presenting module configured to present a secondary media object. The secondary media presenting module delays the primary media object at a point and initiates the secondary media object. The system also includes a primary resuming module configured to resume the presentation of the primary media object such that the primary media object resumes at the point at which the secondary media presenting module delayed the primary media object.

In a further aspect, the present invention provides a method for presenting representative samples to a user while momentarily delaying primary media objects. The method includes detecting an indication to initiate the presentation of a primary media object, such as an audio media object. A primary media play instruction is communicated to a first media rendering engine instructing the first media rendering engine to play the primary media object. The method detects an indication to initiate the presentation of a representative sample, such as an audio media object. The indication to initiate the presentation of the representative sample may be, for example, a selector hovering over a representative sample identifier. The representative sample identifier may be, for example, a song title associated with the representative sample. The method includes communicating a primary media pause instruction to the first media rendering engine to instruct the first media rendering engine to pause the primary media object. The method then initiates a second media rendering engine, and communicates a representative sample play instruction and a representative sample start point to the second media rendering engine. At some point, the method includes detecting an indication to resume the presentation of the primary media object, and communicating a representative sample media stop instruction to the second media rendering engine and a primary media resume instruction to the first media rendering engine.

Having briefly described an overview of embodiments of the present invention, an exemplary operating environment suitable for implementing embodiments hereof is described below.

Figure 1:
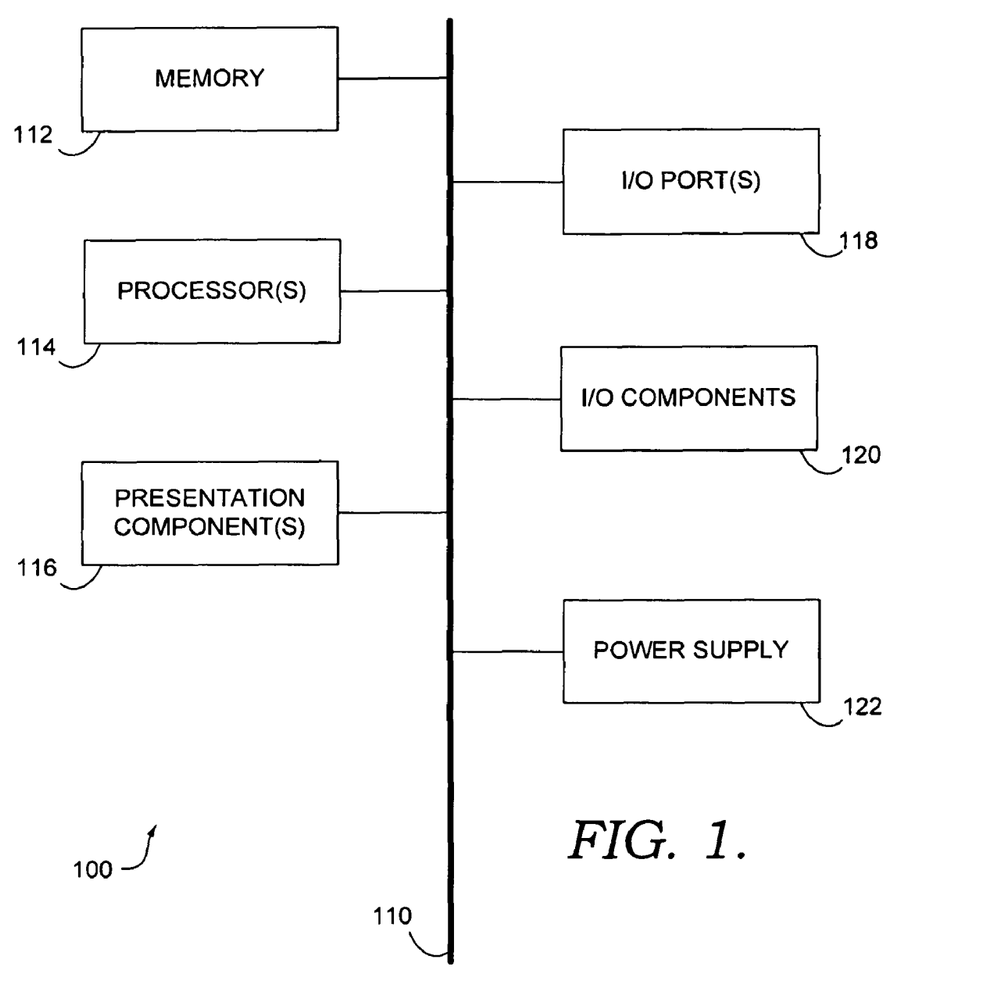
FIG. 1 is a block diagram of an exemplary computing environment suitable for use in implementing embodiments of the present invention.

Referring to the drawings in general, and initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of modules/components illustrated.

Embodiments may be described in the general context of computer code or machine-useable instructions, including computer-executable instructions such as program modules, being executed by a computer or other machine, such as a personal data assistant or other handheld device. Generally, program modules including routines, programs, objects, modules, data structures, and the like, refer to code that performs particular tasks, or implement particular abstract data types. Embodiments may be practiced in a variety of system configurations, including hand-held devices, consumer electronics, general-purpose computers, specialty computing devices, etc. Embodiments may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various modules is not so clear, and metaphorically, the lines would more accurately be grey and fuzzy. For example, one may consider a presentation module such as a display device to be an I/O component. Also, processors have memory. The inventors hereof recognize that such is the nature of the art, and reiterate that the diagram of FIG. 1 is merely illustrative of an exemplary computing device that can be used in connection with one or more embodiments. Distinction is not made between such categories as "workstation," "server," "laptop," "hand-held device," etc., as all are contemplated within the scope of FIG. 1 and reference to "computer" or "computing device."

Computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, carrier wave or any other medium that can be used to encode desired information and be accessed by computing device 100.

Memory 112 includes computer-storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing module, vibrating module, etc. I/O ports 118 allow computing device 100 to be logically coupled to other devices including I/O modules 120, some of which may be built in. Illustrative modules include a microphone, joystick, game pad, satellite dish, scanner, printer, wireless device, etc.

As previously set forth, embodiments of the present invention relate to computing systems for presenting secondary media objects to a user. A media object may be digital or analog content including videos, songs, movies, games, and/or any other type of content. As such, a media object may include, for example, an audio media object, a video media object, a combination thereof, and the like. A combination of media objects may include, for example, a video image or an image object with an audio caption. A secondary media object, as used herein, refers to a media object that is presented to a user while a primary media object is delayed. A primary media object refers to an original media object that is being presented to a user when a secondary media object is initiated.

By way of example only, assume a user is listening to Song 1, a primary media object, via a media player. Further assume that while listening to the second verse of Song 1, the user desires to delay Song 1 so that the user can listen to a portion of Song 2, a secondary media object. In such a case, Song 1 may be delayed such that the user may listen to Song 2. Upon listening to the desired portion of Song 2, Song 1 may resume at the point it was interrupted by the initiation of Song 2, i.e. the second verse of Song 1. One skilled in the art will recognize that primary media objects and secondary media objects may comprise the same type of media object, e.g., both the primary and secondary media object may comprise an audio media object. Alternatively, the primary media object and secondary media object may comprise diverse types of media objects.

In one embodiment, a secondary media object may comprise a representative sample. As used herein, the term "representative sample" refers to a representation of a portion of a media object such that the representation summarizes, reflects, characterizes or otherwise relates to the secondary media object. Accordingly, a representative sample representing a video object may include, for example, a short video clip or trailer relative to a longer video or movie. A representative sample representing an audio media object may include, for example, a short audio sample relative to a longer song or other audio recording.

In some instances, although a user may be presented with a primary media object, the user may desire to preview a secondary media object comprising a representative sample. A representative sample preview may be desired, for example, to identify a media object such that the user can determine whether that particular media object is to be, among other things, navigated, manipulated, stored, copied, added to a playlist, and the like. In various embodiments, a user may preview the representative sample and, thereafter, resume to the primary media object. That is, upon viewing the representative sample, the primary media object may continue playing where it was interrupted when the representative sample was presented. By way of example only, assume a user is looking for songs to include in a playlist while the user is listening to verse 2 of Song 1 within the playlist. Further assume that the user comes across Song 2 for which the user is not familiar. Based on the artist, however, the user believes that Song 2 may be a song of interest. Rather than selecting to listen to unrecognized Song 2 (e.g., add an audio media object to a current list and play the audio media object) and, thereafter, selecting to return to the beginning of Song 1 or the first song within the playlist, the user may preview a representative sample and, subsequently, automatically return to Song 1 at the point that original Song 1 was interrupted.

For the sake of clarity, embodiments described herein generally refer to a single media object; however, embodiments are not limited thereto. Rather, in some embodiments, a set of one or more media objects can be substituted for the media object described herein. A set of one or more media objects may include, for example, a media object container or a media object playlist. A media object container includes a set of related media objects. Such media objects within a container may be related based on, for example, a common artist, a common genre, and the like. A media object container can be a user defined set, such as media objects in a subdirectory, media objects in a playlist, or media objects that are a result of a search.

Figure 2:
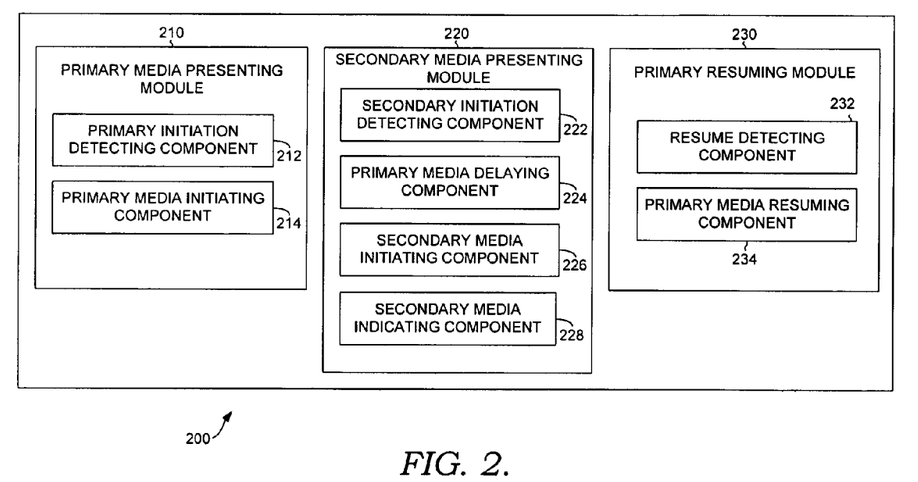
FIG. 2 is a block diagram of an exemplary computing system suitable for use in implementing embodiments of the present invention.

With reference to FIG. 2, a block diagram is illustrated that shows an exemplary computing system 200 configured for presenting a representative sample. It will be understood and appreciated by those of ordinary skill in the art that the computing system 200 shown in FIG. 2 is merely an example of one suitable computing system and is not intended to suggest any limitation as to the scope of use or functionality of the present invention. Neither should the computing system 200 be interpreted as having any dependency or requirement related to any single module/component or combination of modules/components illustrated therein. The single unit depictions are meant for clarity, not to limit the scope of embodiments in any form. In one embodiment, computer system 200 may be incorporated into a media player.

As shown in FIG. 2, an exemplary computer system 200 includes a primary media presenting module 210, a secondary media presenting module 220, and a primary resuming module 230. In some embodiments, one or more of the illustrated modules and/or components may be implemented as standalone applications. In other embodiments, one or more of the illustrated modules and/or components may be integrated directly into the operating system of the server, a cluster of servers, and/or the end-user device. It will be understood by those of ordinary skill in the art that the modules and components illustrated in FIG. 2 are exemplary in nature and in number and should not be construed as limiting. Any number of modules and/or components may be employed to achieve the desired functionality within the scope of embodiments hereof. Further, modules and components may be located on any number of servers or computers.

The primary media presenting module 210 is configured to present a primary media object to a user. In various embodiments, media objects may be presented to a user via a media player. The media player may reside on a personal computer (PC), a laptop computer, a mobile phone, a personal digital assistant (PDA), a portable media player (PMP), or any other device that is capable of presenting media objects. A portable media player (PMP) may include, without limitation, a portable video player (PVP) and a digital audio player (DAP). Illustrative media players include, for example, Windows Media® Player, QuickTime® Player, iTunes®, Winamp®, and the like. In one embodiment, primary media presenting module may include a primary initiation detecting component 212 and a primary media initiating component 214.

The primary initiation detecting component 212 is configured to detect an indication to initiate the presentation of a primary media object. In one embodiment, an indication to initiate the presentation of a primary media object may be provided by a user. In such an embodiment, a user may navigate to a desired media object identifier. A media object identifier refers to any identifier that identifies a media object, such as a particular media object, a media object container, or a media object playlist. In embodiments, a media object identifier may comprise a value, track title, container label, track icon, artist, a symbol, an image, or any other feature that may identify a media object.

Upon navigating to a desired media object identifier, the user may provide an indication to initiate the presentation of a primary media object. For example, a user may navigate to a Song 1 and provide an indication to play Song 1. A user-provided indication to initiate a presentation of a primary media object may include a user's selection of a media object identifier associated with the primary media object desired for presentation. In such a case, a user may select a media object identifier by, among other things, double-clicking on a media object identifier, right-clicking on a media object identifier, hovering over a media object identifier, dragging and dropping a media object identifier, providing an audio command, selecting a media object identifier via a touch screen, and the like.

In embodiments, primary initiation detecting component 212 may detect an indication to initiate a primary media object upon attaining a certain threshold and/or parameter. For example, assume that hovering over a media identifier provides an indication to initiate the presentation of a media object. In such a case, primary initiation detecting component 212 may detect the indication after a media object identifier is hovered over for a particular amount of time, e.g., two seconds. Such threshold and/or parameters may provide a more user-friendly user interface.

In another embodiment, an indication to initiate the presentation of a primary media object may be automatically provided. In such an embodiment, an indication to initiate the presentation of a primary media object may be automatically provided based on the occurrence of an event. Such an event may include, for example, initiating a media player or a media browser.

The primary media initiating component 214 is configured to initiate the presentation of a primary media object. Primary media initiating component 214 may initiate the presentation of a primary media object upon detecting such an indication. In one embodiment, initiating the presentation of a media object may include communicating with a media rendering engine such that a media object may be presented to a user. A media rendering engine may include an engine that is utilized to play media objects. A media rendering engine may reside within a computing device hosting computer system 200 or reside remotely from the computing device hosting computer system 200, such as within another computing device or server.

As such, in one implementation, a primary media initiating component 214 may communicate a play instruction and the primary media object to be presented. In an alternative implementation, such a communication may include a play instruction and a media object identifier to identify the primary media object desired for presentation. In an implementation where a media object identifier is communicated to a media rendering engine, rather than the actual primary media object, the media rendering engine may utilize the media object identifier to obtain or reference the primary media object. In such a case, the primary media object may be stored within the media rendering engine or remote from the media rendering engine, e.g., within another computing device, server, application, or database.

The secondary media presenting module 220 is configured to present a secondary media object. In one embodiment, secondary media presenting module 220 may provide a preview of a representative sample. A representative sample may include the entire media object or a portion of the media object, such as, for example, a portion near the beginning, middle, or end of the media object. A preview of a representative sample may enable a user to identify a media object by presenting a representation of the media object. In embodiments, a preview of a representative sample may be provided without having to restart a primary media object upon completion of the preview. In one embodiment, secondary media presenting module 220 may include secondary initiation detecting component 222, primary media delaying component 224, secondary media initiating component 226, and secondary media indicating component 228. In one embodiment, a representative sample may be presented upon an indication, e.g., hover over media object identifier, irrespective of whether a primary media object is presented while the representative sample is initiated. In such an embodiment, secondary media presenting module 220 may include secondary initiation detecting component 222, secondary media initiating component 226, and secondary media indicating component 228.

The secondary initiation detecting component 222 is configured to detect an indication to initiate the presentation of a secondary media object. In one embodiment, an indication to initiate the presentation of a secondary media object may be provided by a user. In such an embodiment, a user may navigate to a desired media object identifier associated with a secondary media object. Upon navigating to a desired media object identifier, the user may provide an indication to initiate the presentation of a secondary media object. For example, a user may navigate to a Song 2 and provide an indication to play Song 2.

A user-provided indication to initiate the presentation of a secondary media object may include a user's selection of a media object identifier associated with the secondary media object desired for presentation. In such a case, a user may select a media object identifier associated with a secondary media object by, among other things, double-clicking on a media object identifier, right-clicking on a media object identifier, hovering over a media object identifier, dragging and dropping a media object identifier, providing an audio command, selecting a media object identifier via a touch screen, and the like. Alternatively, a user interface or visuals that contains a control for starting and/or stopping the playback of the representative sample may be provided upon a user-provided indication, such as double-clicking on a media object identifier, hovering over a media object identifier, and the like. In such an embodiment, the user may utilize the control to start and/or stop the presentation of a secondary media object.

Figure 3:
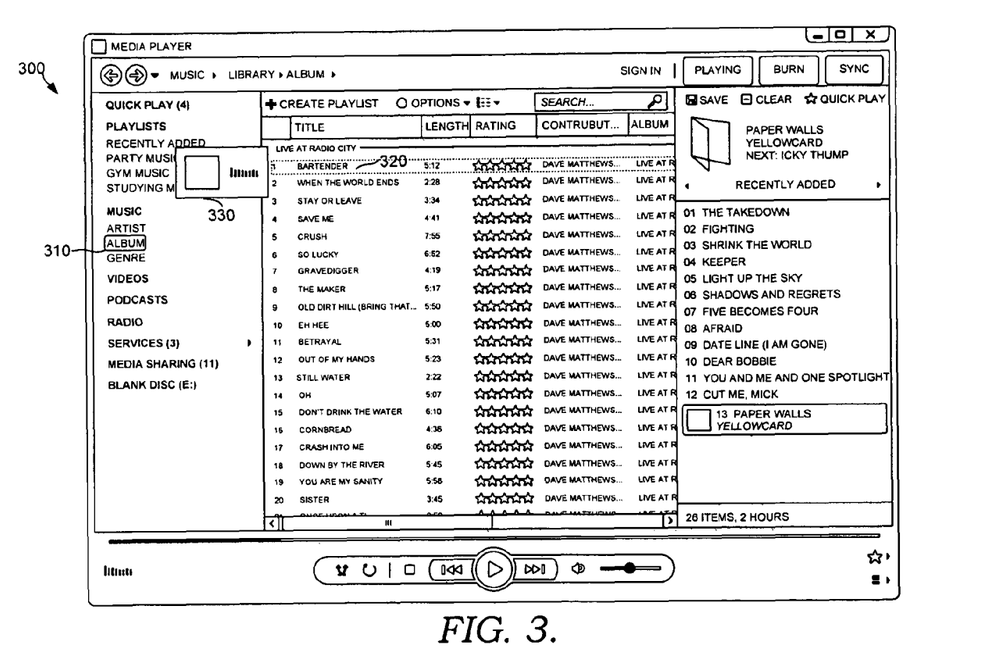
FIG. 3 illustrates an exemplary display of a secondary media object initiation feature, in accordance with an embodiment of the present invention.
Figure 4:
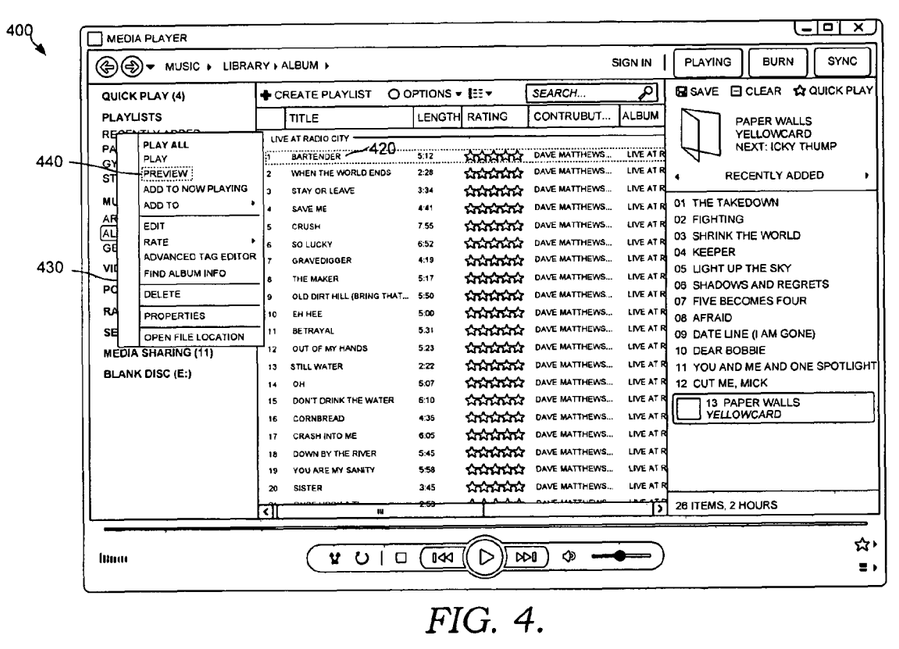
FIG. 4 illustrates an exemplary display of a secondary media object initiation feature, in accordance with an embodiment of the present invention.

By way of example, with reference to FIG. 3, assume media player display 300 is presented to a user and a primary song is currently playing. The user may navigate to view a Dave Matthews Album 310. Assume the user is unfamiliar with the song titled "Bartender" 320. To initiate the presentation of a secondary media object comprising the "Bartender" audio, the user may select or hover over the song title "Bartender" 320. In an alternative embodiment, with reference to FIG. 4, assume media player display 400 is presented to a user, and the user is unfamiliar with the song titled "Bartender" 420. To initiate the presentation of a secondary media object comprising the "Bartender" audio, the user may right click on the song title "Bartender" 320 to present a menu 430 including an option to preview 440 the selected media object.

In embodiments, secondary initiation detecting component 222 may detect an indication to initiate the presentation of a secondary media object upon attaining a certain threshold and/or parameter. For example, assume that hovering over a media identifier provides an indication to initiate the presentation of a secondary media object. In such a case, secondary initiation detecting component 222 may detect the indication after a media object identifier is hovered over for a particular period of time, e.g., two seconds. Such a selection mechanism enables a user to benefit from a "no click" media preview. Threshold and/or parameters may provide a more user-friendly user interface.

Returning to FIG. 2, the primary media delaying component 224 is configured to delay the rendering of a primary media object such that a secondary media object may be presented to a user. Accordingly, primary media delaying component 224 may utilize any means to delay the presentation of a primary media object. In one embodiment, primary media delaying component 224 may pause the primary media object. In such an embodiment, a pause instruction may be communicated to the media rendering engine presenting the primary media object.

Alternatively, in another embodiment, primary media delaying component 224 may stop the primary media object such that the primary media object may resume at a later instance. Accordingly, a stop instruction may be communicated to the media rendering engine presenting the media object. In such an embodiment, to resume the primary media object at a later instance, without beginning the media object at the beginning, primary media delaying component 224 may identify the stopping point at which the primary media object was delayed. Such a stopping point may be stored, utilizing memory or a storage device, for a later communication or retrieval.

In one embodiment, a media effect may be associated with delaying, e.g., stopping or pausing, a primary media object. A media effect may refer to any presentation effect applied to a media object. Media effects may include, but are not limited to, fades, flashes, highlights, captions, visuals showing animation or progress, controls to start and/or stop media objects, and the like. Such media effects may provide an indication to a user that a different media object is being presented. By way of example, a primary media object may fade out as the primary media object is stopped or paused. In embodiments, media effects may be initiated via a media player or a media rendering engine.

The secondary media initiating component 226 is configured to initiate the presentation of a secondary media object. In various embodiments, secondary media initiating component 226 may initiate a secondary media object upon detecting an indication to initiate the presentation of the secondary media object.

In an embodiment where a primary media object is paused so that a secondary media object may be presented, a second media rendering engine may be initiated to present the secondary media object. Alternatively, in an embodiment where a primary media object is stopped so that a secondary media object may be presented, any media rendering engine may be initiated to present the secondary media object. One skilled in the art will recognize that, in such an embodiment, the same media rendering engine used to present the primary media object may also be used to present the secondary media object.

Regardless of whether a unique media rendering engine is utilized for both the primary and secondary media objects or whether the same media rendering engine is utilized for both the primary and secondary media objects, in one embodiment, initiating the presentation of a secondary media object may include communicating with a media rendering engine so that a secondary media object may be presented to a user. As such, in one implementation, secondary media initiating component 226 may communicate a play instruction and the secondary media object to be presented. In an alternative implementation, such a communication may include a play instruction and a media object identifier to identify the secondary media object desired for presentation. In an implementation where a media object identifier, rather than the actual secondary media object, is communicated to the media rendering engine, the media rendering engine may utilize the media object identifier to obtain or reference the secondary media object. In such a case, the secondary media object may be stored within the media rendering engine or remote from the media rendering engine, e.g., within another computing device, server, application, or database.

In some embodiments, a start point may also be communicated to the media rendering engine. A start point identifies the point at which the media rendering engine should begin presenting the secondary media object. The start point may include the portion of the media object selected to be presented as the representative sample. In one implementation, the start point may comprise a default start point. A default start point may refer to a start point that is standard to a number of media objects. Default start points may include, for example, the beginning of the media object, the middle of the media object, or a particular time into the media object, e.g. twenty seconds into the media object. For example, assume an audio representative sample is desired. In such a case, the media rendering engine may begin playing the song at twenty seconds into the song. One skilled in the art will recognize that such a default start point may be any amount of time, frame number, or other identifier. Such a default start point may be determined based on research and/or an algorithm. Such a default start time may be communicated to the media rendering engine.

In another implementation, the portion of the media object data selected for a representative sample may be determined based on processing the secondary media object to detect identifying characteristics. As such, algorithms or lookup tables may be utilized to determine a default start point. For example, in the case of an audio media object, the audio media object may be examined to detect portions having the best suited peak amplitude or dynamic range. The best suited peak amplitude or dynamic range may occur at a particular portion of the audio media object wherein numerous instruments are playing, a chorus is being sung, and the like. In the case of a video media object, the video media object may be examined to detect portions having a dynamic contrast or an apparent motion. Such a default start point may be dynamically determined and communicated to the media rendering engine or, alternatively, predetermined and stored within a storage device to be communicated or retrieved at a later instance.

In an alternative embodiment, the media rendering engine may determine or identify a start point. In such an embodiment, the media rendering engine may utilize a default start point or utilize an algorithm or lookup table to determine a start point suitable for the secondary media object.

In one embodiment, a media effect may be associated with initiating a secondary media object. Such media effects may provide an indication to a user that a different media object is being presented. By way of example, a secondary media object may fade in as the secondary media object is initiated. In embodiments, media effects may be initiated via a media player or a media rendering engine.

The secondary media indicating component 228 is configured to present an indication of the rendering of a secondary media object. A secondary media object indication may include text, a value, an icon, an audio alert, and the like. Such an indication may notify the user that the media presented is a secondary media object, such as a representative sample. With reference to FIG. 3, assume that to initiate the presentation of a secondary media object comprising the "Bartender" audio, the user selects or hovers over the song title "Bartender" 320. In such a case, an indication 330 of the rendering of a secondary media object may be displayed.

The primary resuming module 230 is configured to resume the primary media object. In one embodiment, primary resuming module 230 may comprise a resume detecting component 232 and a primary media resuming component 234.

The resume detecting component 232 is configured to detect an indication to resume the presentation of the primary media object. In one embodiment, an indication to resume the presentation of the primary media object may be provided by a user. In such an embodiment, a user may navigate to the media object identifier associated with the primary media object. Upon navigating to the primary media object identifier, the user may provide an indication to resume the presentation of the primary media object. For example, a user may navigate to Song 1 and provide an indication to resume Song 1. A user-provided indication to resume the presentation of the primary media object may include a user's selection of a media object identifier associated with the primary media object desired for presentation. In such a case, a user may select a media object identifier associated with the primary media object by, among other things, double-clicking on a media object identifier, right-clicking on a media object identifier, hovering over a media object identifier, dragging and dropping a media object identifier, providing an audio command, selecting a media object identifier via a touch screen, and the like.

Alternatively, rather than a user navigating to the media object identifier associated with the primary media object to be resumed, the user may deselect the second media object. As such, upon deselecting the secondary media object, the primary media object may be resumed. By way of example, assume a secondary media object is initiated based on a user hovering over a media object identifier associated with the secondary media. In such a case, when the user removes the selector such that it is no longer hovering over the media object identifier, the primary media object may be resumed.

In another embodiment, an indication to resume the presentation of the primary media object may be automatically provided. In such an embodiment, an indication to resume a primary media object may be automatically provided based on the occurrence of an event. Such an event may include, for example, the completion of the secondary media object.

The primary media resuming component 234 is configured to resume the primary media object. In embodiments, the primary media resuming component 234 resumes the primary media object such that the primary media object is presented at the point at which the primary media object was delayed. In an embodiment where a pause instruction is initially communicated to the first media rendering engine to pause the primary media object and a second media rendering engine is initiated to present the secondary media object, a stop instruction may be communicated to the second media rendering engine to stop the presentation of the secondary media object. In addition to communicating a stop instruction to the second media rendering engine, a start communication may also be sent to the first media rendering engine, e.g., the media rendering engine initially playing the primary media object. In such a case, the first media rendering engine continues playing the media at the point at which the primary media object was delayed.

In an embodiment where a stop instruction is initially communicated to the first media rendering engine to stop the primary media object and a media rendering engine is initiated to present the secondary media object, a stop instruction may be communicated to the media rendering engine presenting the secondary media object to stop the presentation of the secondary media object. In addition to communicating a stop instruction to the media rendering engine presenting the secondary media object, a start instruction and start point may also be communicated to the any media rendering engine. One skilled in the art will recognize that the stop instruction and start instruction may coincide. That is, rather than communicating a distinct stop instruction, the media rendering engine may automatically stop the second media object upon receiving a start instruction and/or presenting the primary media object.

In instances where the primary media object is stopped, rather than paused, a start point may be necessary in order for the media rendering engine to continue playing the media at the point at which the primary media object was delayed. The start point may be identified based on a corresponding stopping point identified at a previous instance, e.g., identified by primary media delaying component 224. Alternatively, the start point may be a point prior to or following the primary media object stopping point. For example, the start point can be a few seconds prior to the point at which the primary media object was interrupted. The stopping and/or starting point may be stored within memory or a data store associated with the media player, media rendering engine, or other associated computing device or server.

In one embodiment, a media effect may be associated with stopping a secondary media object and/or resuming a primary media object. Such media effects may provide an indication to a user that a different media object is being presented. By way of example, a secondary media object may fade out as the secondary media object ends, and a primary media object may fade in as the primary media object resumes. In embodiments, media effects may be initiated via a media player or a media rendering engine.

In one embodiment, primary media resuming component 234 is configured to remove the secondary media object indication. Such a removal of the secondary media object indication may notify the user that the primary media object has resumed.

Figure 5:
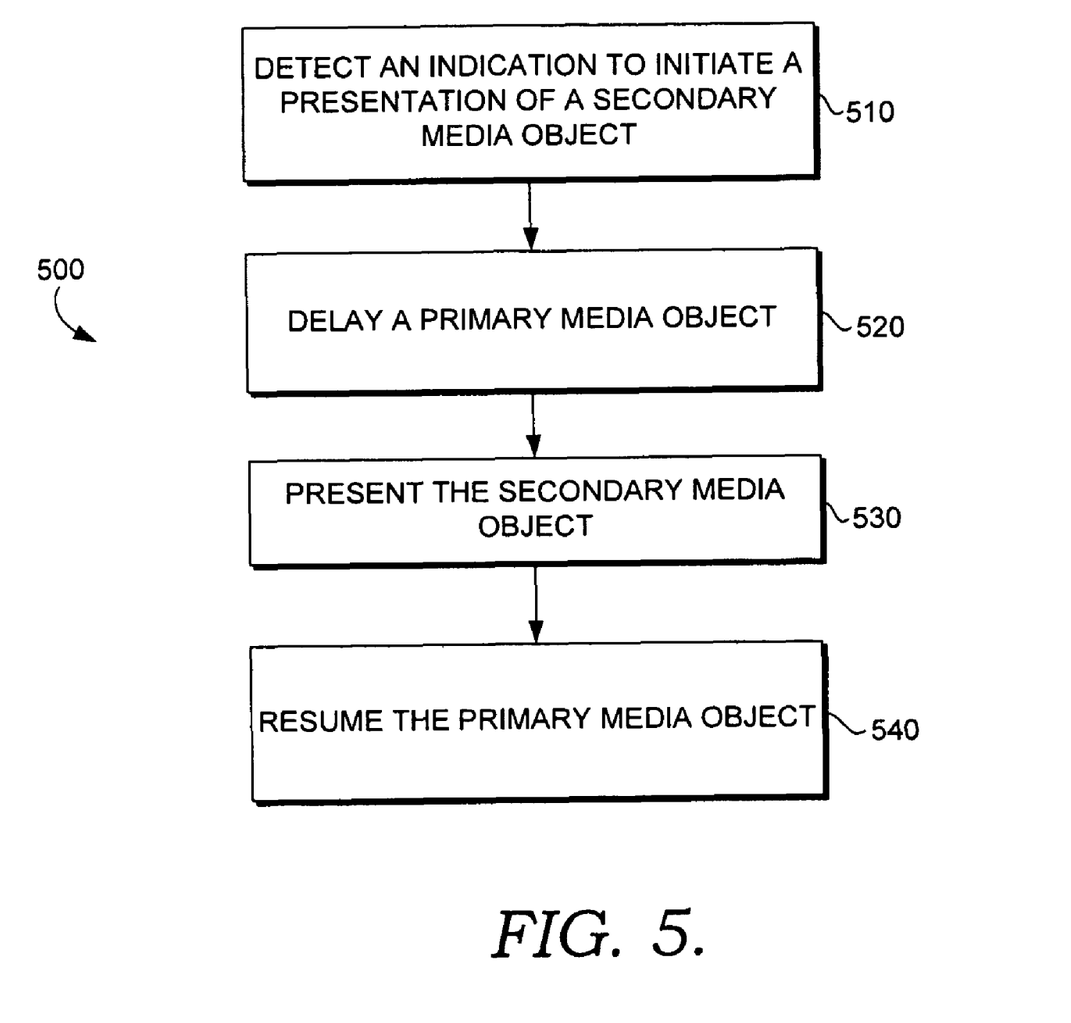
FIG. 5 is a flow diagram illustrating a first exemplary method for presenting a secondary media object, in accordance with an embodiment of the present invention.

Referring now to FIG. 5, an exemplary method for presenting a secondary media object in accordance with an embodiment of the present invention is presented. Initially, as indicated at block 510, an indication to initiate a presentation of a secondary media object is detected. Thereafter, at block 520, a primary media object is delayed. In embodiments, the primary media object may be delayed, for example, utilizing a stop command or a pause command. The secondary media object is presented at block 530. Subsequently, at block 540, the primary media object is resumed. The primary media object may be resumed automatically (e.g., the secondary media object ended) or based on a user indication (e.g., user removed selector from a secondary media object identifier).

Figure 6:
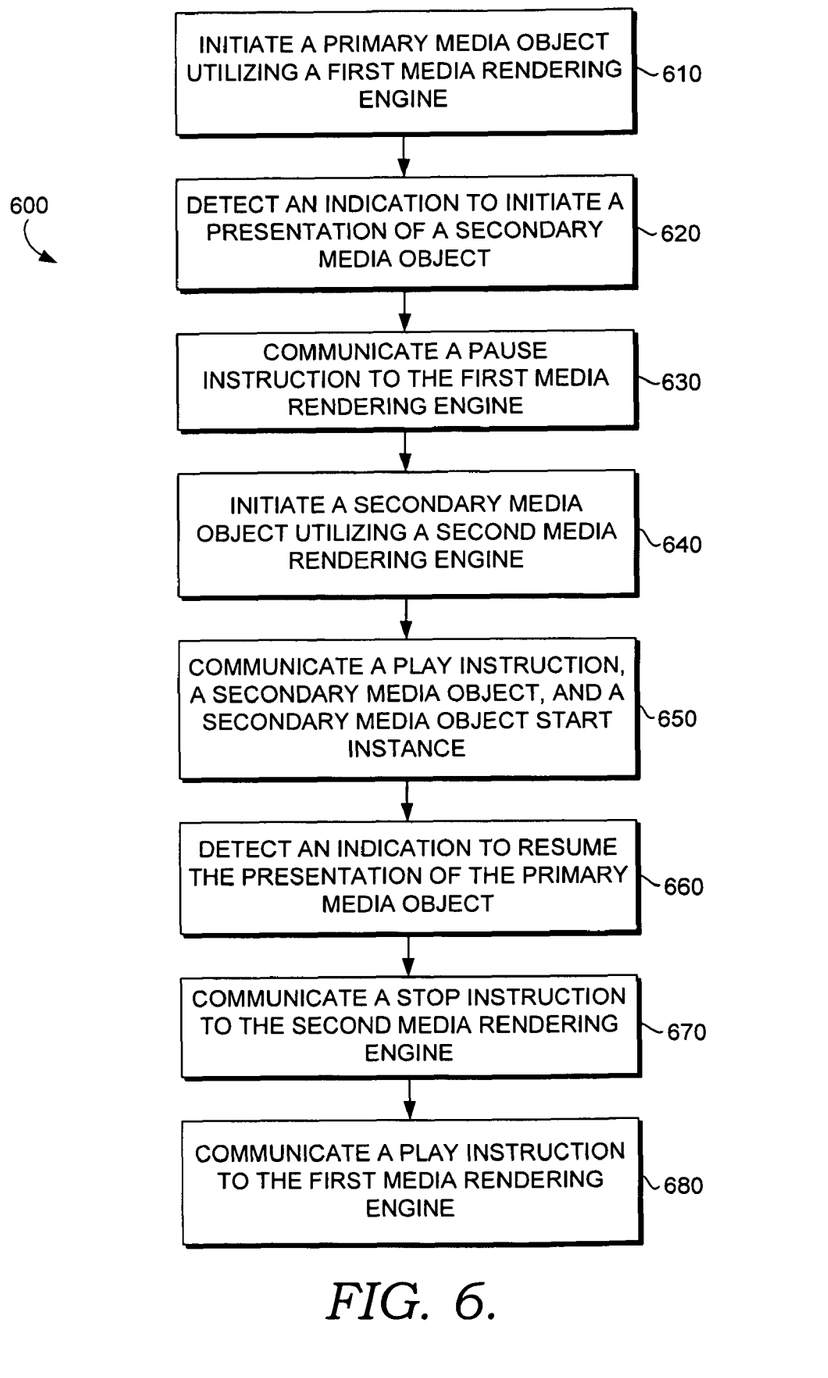
FIG. 6 is a flow diagram illustrating a second exemplary method for presenting a secondary media object, in accordance with an embodiment of the present invention.

With reference to FIG. 6, in accordance with an embodiment of the present invention, an exemplary method 600 for presenting a secondary media object is illustrated. Initially, as indicated at block 610, a primary media object is initiated utilizing a first media rendering engine. Thereafter, at block 620, an indication to initiate a presentation of a secondary media object is detected. A pause instruction is communicated to the first media rendering engine. This is indicated at block 630. At block 640, a secondary media object is initiated utilizing a second media rendering engine. Upon initiating a secondary media object utilizing a second media rendering engine, a play instruction, secondary media object, and secondary media object start point are communicated to the second media rendering engine. This is indicated at block 650. At block 660, an indication to resume the presentation of the primary media object is detected. Such an indication may occur automatically upon the completion of the secondary media object or based on a user indication. Subsequently, a stop instruction is communicated to the second media rendering engine presenting the secondary media object, as indicated at block 670. At block 680, a play instruction is communicated to the first media rendering engine.

Figure 7:
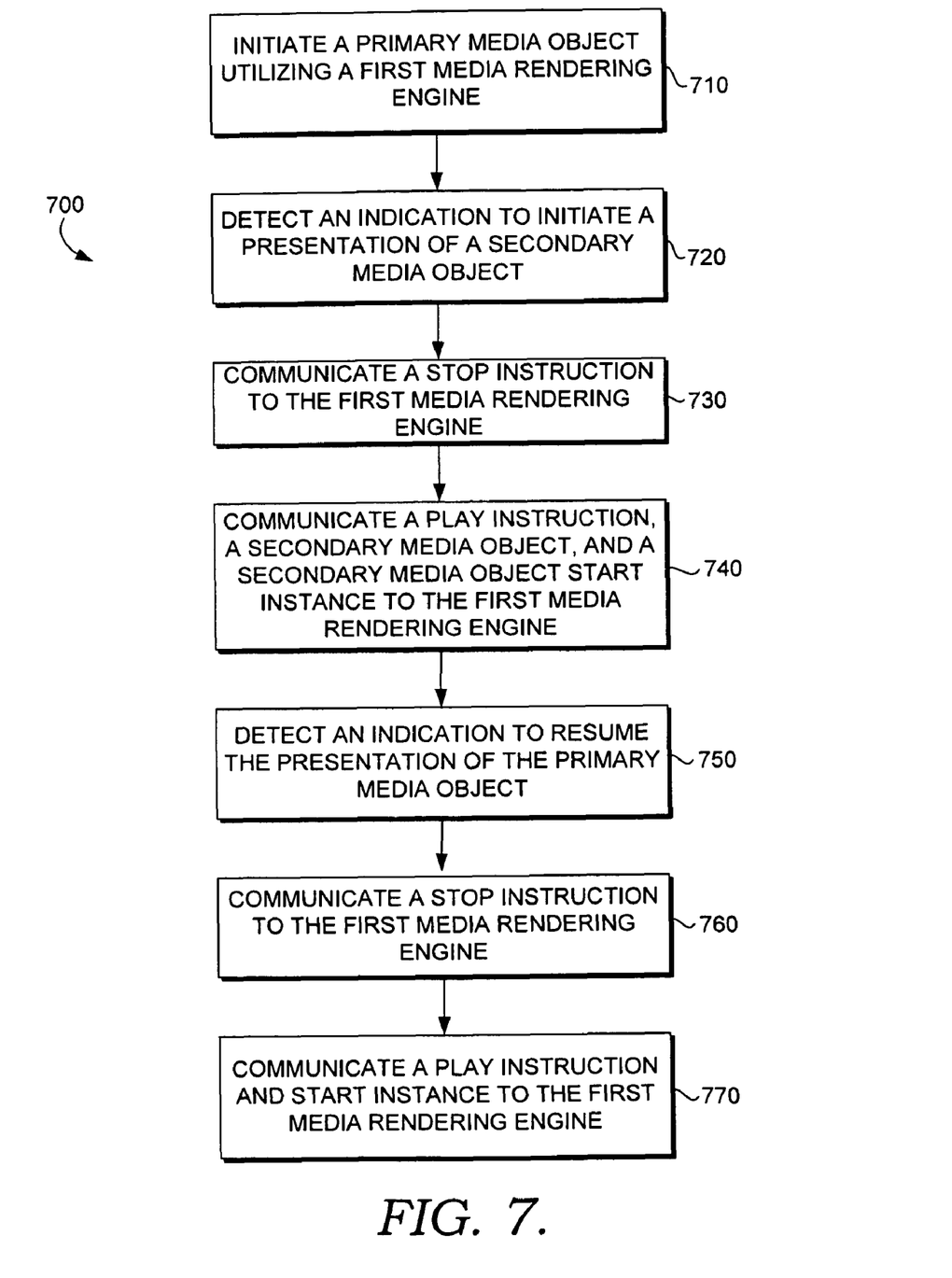
FIG. 7 is a flow diagram illustrating a third exemplary method for presenting a secondary media object.

With reference to FIG. 7, in accordance with an embodiment of the present invention, another exemplary method 700 for presenting a secondary media object is illustrated. Initially, as indicated at block 710, a primary media object is initiated utilizing a first media rendering engine. Thereafter, at block 720, an indication to initiate a presentation of a secondary media object is detected. A stop instruction is communicated to the first media rendering engine. This is indicated at block 730. At block 740, a play instruction, secondary media object, and secondary media object start point are communicated to the first media rendering engine such that the secondary media object may be presented to a user. At block 750, an indication to resume the presentation of the primary media object is detected. Such an indication may occur automatically upon the completion of the secondary media object or based on a user indication. Subsequently, a stop instruction is communicated to the first media rendering engine presenting the secondary media object, as indicated at block 760. At block 770, a play instruction and start point is communicated to the first media rendering engine such that the primary media object may resume to the point at which it was delayed.

Embodiments described herein are intended in all respects to be illustrative rather than restrictive. Alternative embodiments will become apparent to those of ordinary skill in the art without departing from the scope of embodiments described herein.

From the foregoing, it will be seen that embodiments of the present invention are well adapted to attain ends and objects set forth above, together with other advantages which are obvious and inherent to the systems and methods described. It will be understood that certain features and sub-combinations are of utility and may be employed without reference to other features and sub-combinations. This is contemplated by and is within the scope of the claims.

What is claimed is:

1. One or more computer-storage media having computer-executable instructions embodied thereon that, when executed, perform a method for presenting secondary media objects to a user while momentarily delaying primary media objects being presented, the method comprising:
   detecting an indication to play a secondary audio object selected by a user, wherein the indication to play the secondary audio object is detected while a primary audio object is presented to the user via a media player;
   delaying playing the primary audio object at a stopping point to preview the secondary audio object selected by the user that is different from the primary audio object;
   playing the secondary audio object using the media player; and
   automatically resuming playing the primary audio object, wherein the primary audio object resumes playing at the stopping point via the media player and playing the second audio object is discontinued.

2. The computer-storage media of claim 1, wherein the indication to play the secondary audio object comprises moving a selector to hover over a secondary media object identifier, wherein the secondary media object identifier identifies the secondary audio object desired to be initiated.

3. The computer-storage media of claim 2 further comprising detecting an indication to resume playing the primary audio object.

4. The computer-storage media of claim 3, wherein the indication to resume playing the primary audio object comprises removing the selector hovering over the secondary media object identifier.

5. The computer-storage media of claim 1, wherein delaying the primary audio object at a stopping point comprises pausing the primary audio object.

6. The computer-storage media of claim 1, wherein delaying the primary audio object at a stopping point comprises stopping the primary audio object.

7. The computer-storage media of claim 1, wherein presenting the secondary audio object comprises presenting the secondary audio object having a fade in effect.

8. The computer-storage media of claim 1, wherein resuming the primary audio object comprises communicating a stop instruction associated with the secondary audio object and communicating a start instruction associated with the primary audio object.

9. A computerized system for presenting secondary media objects to a user while momentarily delaying primary media objects, the system comprising:
　a primary media presenting module configured to play a primary audio object;
　a secondary media presenting module configured to play a secondary audio object selected by a user, the secondary media presenting module delaying the playing of the primary audio object at a point and initiating playing the secondary audio object selected by the user that is different from the primary audio object; and
　a primary resuming module configured to automatically resume playing the primary audio object such that the primary audio object automatically resumes playing at the point at which the secondary media presenting module delayed playing the primary audio object and stop playing the secondary audio object.

10. The method of claim 9, wherein the primary media presenting module comprises:
　a primary initiation detection component configured to detect an indication to play the primary audio object; and
　a primary media initiating component configured to initiate playing primary audio object.

11. The method of claim 9, wherein the secondary media presenting module comprises:
　a secondary initiation detecting component configured to detect an indication to play a secondary audio object;
　a primary media delaying component configured to delay the rendering of the primary audio object, wherein the primary media delaying component may provide a communication to a media rendering engine comprising a stop instruction or a pause instruction; and
　a secondary media initiating component configured to initiate playing the secondary audio object.

12. The method of claim 11, wherein the indication to initiate playing the secondary audio object comprises selecting a secondary media object identifier.

13. The method of claim 9, wherein the primary resuming module comprises:
　a resume detecting component configured to detect an indication to resume the presentation of the primary audio object; and
　a primary media resuming component configured to resume the primary audio object such that the primary audio object is presented at the point at which the primary audio object was delayed.

14. The method of claim 13, wherein the indication to resume playing the primary audio object comprises deselecting the secondary media object identifier.

15. The method of claim 9, wherein the secondary audio object comprises a representative sample.

16. A method for presenting representative samples to a user while momentarily delaying primary media objects, the method comprising:
　detecting an indication to initiate the presentation of a primary media object, wherein the primary media object comprises a first song;
　communicating a primary media play instruction to a first media rendering engine, wherein the primary media play instruction instructs the first media rendering engine to play the primary media object;
　detecting an indication to initiate the presentation of a representative sample comprising a representative portion of a second song different from the first song, wherein the indication to initiate the presentation of the representative sample being detected as the primary media object is playing via the user selecting the particular second song desired to be previewed by positioning a selector over a representative sample identifier, the representative sample identifier comprising a song title associated with the representative sample;
　communicating a primary media pause instruction to the first media rendering engine to instruct the first media rendering engine to pause the primary media object;
　initiating a second media rendering engine;
　communicating a representative sample play instruction and a representative sample start point to the second media rendering engine;
　detecting an indication to automatically resume the presentation of the primary media object;
　communicating a representative sample stop instruction to the second media rendering engine; and
　communicating a primary media resume instruction to the first media rendering engine.

17. The method of claim 16, wherein detecting an indication to resume the presentation of the primary media object comprises an automatic indication based on the completion of the representative sample.

18. The method of claim 16, wherein detecting an indication to resume the presentation of the primary media object comprises removing the selector hovered over the representative sample media object identifier.

* * * * *

UNITED STATES PATENT AND TRADEMARK OFFICE
CERTIFICATE OF CORRECTION

PATENT NO.         : 8,140,974 B2  
APPLICATION NO.    : 11/956975  
DATED              : March 20, 2012  
INVENTOR(S)        : Hayter et al.

Page 1 of 1

It is certified that error appears in the above-identified patent and that said Letters Patent is hereby corrected as shown below:

In the Claims

Column 13, line 52, In Claim 10, after "playing" insert -- the --.

Column 14, line 46, In Claim 16, after "to" delete "automatically".

Signed and Sealed this  
Third Day of February, 2015

Michelle K. Lee  
*Deputy Director of the United States Patent and Trademark Office*